United States Patent
MacEwen et al.

(10) Patent No.: US 12,054,670 B2
(45) Date of Patent: Aug. 6, 2024

(54) SUBTERRANEAN FORMATIONS

(71) Applicant: Independence Oilfield Chemicals LLC, Houston, TX (US)

(72) Inventors: Kimberley MacEwen, Cypress, TX (US); Kurt Hoeman, Houston, TX (US); Jeffrey C. Dawson, Conroe, TX (US)

(73) Assignee: INDEPENDENCE OILFIELD CHEMICALS LLC, Houston, TX (US)

( * ) Notice: Subject to any disclaimer, the term of this patent is extended or adjusted under 35 U.S.C. 154(b) by 0 days.

(21) Appl. No.: 17/436,694

(22) PCT Filed: Feb. 24, 2020

(86) PCT No.: PCT/GB2020/050428
§ 371 (c)(1),
(2) Date: Sep. 7, 2021

(87) PCT Pub. No.: WO2020/178550
PCT Pub. Date: Sep. 10, 2020

(65) Prior Publication Data
US 2022/0145169 A1    May 12, 2022

Related U.S. Application Data

(60) Provisional application No. 62/814,425, filed on Mar. 6, 2019.

(51) Int. Cl.
*C09K 8/88*  (2006.01)
(52) U.S. Cl.
CPC ............ *C09K 8/88* (2013.01); *C09K 2208/26* (2013.01); *C09K 2208/28* (2013.01)
(58) Field of Classification Search
CPC .. C09K 8/88; C09K 2208/26; C09K 2208/28; C09K 8/68
See application file for complete search history.

(56) References Cited

U.S. PATENT DOCUMENTS

| | | | |
|---|---|---|---|
| 5,674,817 A | 10/1997 | Brezinski et al. | |
| 6,030,928 A * | 2/2000 | Stahl | E21B 43/24 507/121 |
| 2005/0155765 A1* | 7/2005 | Harris | F17D 1/17 166/308.1 |
| 2009/0145607 A1* | 6/2009 | Li | C09K 8/685 166/308.5 |
| 2012/0214714 A1* | 8/2012 | Whitwell | C09K 8/88 507/224 |
| 2014/0352960 A1 | 12/2014 | Chung et al. | |
| 2017/0114272 A1 | 4/2017 | Vo et al. | |

FOREIGN PATENT DOCUMENTS

| | | | | |
|---|---|---|---|---|
| WO | 2017096055 A1 | 6/2017 | | |
| WO | WO-2017096055 A1 * | 6/2017 | ............ | C08F 220/56 |
| WO | 2017187150 A1 | 11/2017 | | |

OTHER PUBLICATIONS

Dulin et al., "Identification and Remediatoin of Produced Solids Accumulation Occurring After Massive Hydraulic Water Fracs", Society of Petroleum Engineers, Paper SPE-173594-MS, dated Mar. 2015.
International Search Report (ISR) for PCT/GB2020/050428 mailed May 6, 2020 (3 pages).
Written Opinion for PCT/GB2020/050428 mailed May 6, 2020 (6 pages).

* cited by examiner

*Primary Examiner* — Kumar R Bhushan
(74) *Attorney, Agent, or Firm* — Shumaker, Loop & Kendrick, LLP

(57) ABSTRACT

A method of treating a subterranean formation, for example a subterranean formation susceptible to formation of a undesirable gel-like goo ;- is-described. The method includecomprises contacting the formation with a fluid (A) havingcomprising a polymer (PP) which includes a pendent group which includes a moiety
O-S=0 (I) wherein the sulphur atom of the moiety is covalently bonded, optionally via a linking atom or group, to the backbone of the polymer.

25 Claims, No Drawings

SUBTERRANEAN FORMATIONS

TECHNICAL FIELD AND BACKGROUND

The invention relates to subterranean formations and particularly, although not exclusively, relates to a method of treating, for example fracturing, a subterranean formation.

Hydraulic fracturing is a process needed to produce oil and gas from unconventional reservoirs such as coal beds, tight sandstones and shales. In this process, a fracturing fluid is injected at a rate and pressure necessary to cause formation failure by inducing fractures or cracks in the formation. These cracks originate at the well-bore and radiate out into the formation. The common practice in unconventional reservoirs is to initiate entry into the reservoir with a small slug of acid pumped at low rates followed by injection of a low viscosity water pumped at increasing rate until the design pump rate is achieved. These high rates typically can range from 50 to 100 barrels per minute. In order to pump at these high rates, small amounts of friction reducers are added to the fracturing fluid. These friction reducers are normally 100 to 1,000 ppm of polyacrylamide polymers and copolymers. These low viscosity, friction reducer assisted fluids are referred to as slick-water and the process or treatment is referred to as slick-water fracturing.

Once the treatment achieves a desired rate, a small loading of propping agent or proppant is added to the fluid. Typically, most proppant comprises small-sized sand such as 0.25 pounds of 100 mesh sand per gallon of water. As the job proceeds, the amount of sand is systematically increased and at some point, the size of the sand may be increased to 40/70, 30/50 mesh and on occasion, 20/40 mesh frac sand that is well-rounded and near spherical. The purpose of the sand is so the resulting sand pack, being orders of magnitude more permeable than the formation, maintains a conductive pathway from the reservoir to the well-bore for the recovery of the reservoir fluids. The amount of sand commonly used in the fracturing treatment will range from 200,000 lb to 500,000 lb per fracturing stage and the water can commonly range from 2,000 to 7,000 barrels of water.

Once a hydraulic fracturing process is completed aqueous fluids are expelled from rock and return to the surface. The returned aqueous fluids may contain flow back water (water contained in the fracturing fluid) or production brine (natural formation water or connate water that contain minerals that were part of the subsurface formation), sand, oil, friction reducer polymers and treatment chemicals (scale, corrosion, clay inhibitors etc.).

In some wells where the back produced waters is found to contain iron, an unusual, undesirable gel-like goo may be produced from the well bore. The undesirable gel-like goo may comprise a globular mass comprising proppant, clay, residual quasi-iron crosslinked friction reducer, iron laden asphaltenes, oil in singular or combination and may also have liquids such brines, formation water, hydrocarbons entrained within. Sources of iron include the well bore casing, injection water, formation material, connate waters, adjacent break-through water bearing zones and asphaltenes.

During the early stages of oil production, post the hydraulic fracturing process, the undesirable gel-like goo is formed within the well bore, fracture network, proppant pack etc. and is co-produced intermittently in conjunction with normal recovery and/or later production.

Wells in which the undesirable gel-like goo is formed contain iron. In one example, such wells may be found in Oklahoma, for example in Woodford, Oklahoma. Such wells are found to have certain characteristics which are described herein.

The problem of the formation of the undesirable gel-like goo as described is a recognised problem and solutions to the problem have been described.

U.S. Pat. No. 5,674,817 (Halliburton) describes a problem associated with use of aqueous well fracturing fluids in the presence of dissolved iron. In particular, presence of the iron leads to undesirable ferric ion cross-linking resulting in the viscosity of the fracturing fluid undesirably increasing. The document recognises that while iron precipitate control additives have been developed and used, the presence of such additives in viscosified aqueous fracturing fluids can significantly hasten the destruction of the viscosified hydrated polymer incorporated in the fracturing fluid which may prevent successful completion of the fracturing process. The solution to the problem according to the document is to add a ferric ion reducing agent to the fracturing fluid in an amount sufficient to prevent the precipitation of the ferric compound or the undesirable cross-linking of polymer in the fracturing fluid.

The Society of Petroleum Engineers Paper SPE-173594-MS (Halliburton) (herein incorporated by reference its entirety) discusses "Identification and Remediation of Produced Solids Accumulation Occurring After Massive Hydraulic Water Fracs". The document discusses characteristics of a rubbery semi-solid and discusses remediation of affected wells. For example, it is stated that remediation is usually performed using citric acid with a diverter, wherein the citric acid acts as a chelator. The document suggests that remediation treatments have shown tremendous success but it is believed they are a short-term fix and, indeed, this has turned out to be the case.

Another attempt to solve the problem has involved use of friction reducers that are cationic in nature. However, these were found to only delay the onset of the formation of a rubbery deposit.

The prior art methodology focused on remediation of this problem has involved using chemical mixtures in an attempt to break down the undesirable gel-like goo. Such mixtures may involve:
  Organic acid (citric, acetic, formic)
  Oxidizing breakers (hydrogen peroxide, sodium hydroxide, persulfate)
  Surfactant or penetrating agents
  Paraffin dispersants or solvents
  Paraffin and/or scale inhibitors.

SUMMARY

It is an object of the invention to address the above described problems.

It is an object of preferred embodiments of the invention to minimise or eliminate production of the undesirable gel-like goo described in regions which are otherwise susceptible to its production.

DETAILED DESCRIPTION

According to a first aspect of the invention, there is provided a method of treating a subterranean formation, for example a subterranean formation susceptible to formation of a undesirable gel-like goo, the method comprising contacting the formation with a fluid (A) comprising a polymer (PP) which includes a pendent group which includes a moiety $$O-S=O \quad (I)$$

wherein the sulphur atom of the moiety is covalently bonded, optionally via a linking atom or group, to the backbone of the polymer.

Unless otherwise stated herein, a reference to ppm refers to parts per million by weight.

Characteristics of the undesirable gel-like goo include:
Physical:
It may be a semi-solid, for example a rubbery semi-solid.
It may comprise a tight emulsion, for example a tight-emulsion in semi-solid form.
It may be tacky.
It may be gelatinous in nature.
Compositional:
It may comprise iron or an iron compound.
It may comprise a friction reducing polymer. The friction reducing polymer may be present within the goo at a concentration significantly higher than in a treatment fluid, for example 10 times greater, or 50 times greater, 100 times greater, for example 300 times greater.
It may comprise a quasi cross-linked friction reducer, or residue of a friction reducer quasi crosslinked by a suitable multivalent cation present within the formation, for example a residual quasi-iron crosslinked friction reducer.
It may be a complex mixture and further comprise one or more of: fines from the formation, proppant, iron laden asphaltenes, crude oil, iron from the casing, iron carbide from the casing.

Said undesirable gel-like goo may comprise iron (in any form). A subterranean formation susceptible to formation of undesirable gel-like goo may be a formation which is: (i) one that is previously known to form an undesirable gel-like goo or (ii) one that is similar in minerology to a formation known to form an undesirable gel-like goo. The formation may be one that is located close to (eg within 10 km, for example within 5 km, 2 km, 1 km or 500 m of) a well that is known to form an undesirable gel-like goo. It is recognisable that the distance between the wells will be depend on multiple factors.

Said moiety (I) is preferably an anionic moiety.

Moiety (I) may be part of a moiety of formula $$O=S=O \atop | \atop O \qquad (II)$$

Moiety (II) is preferably an anionic moiety.

Said moiety (I) and/or moiety (II) may be pendent from a repeat unit of formula $$\begin{array}{c} R^1 \ \ R^2 \\ | \ \ | \\ -\!\!\!\!-(C-C)\!\!\!\!- \\ | \ \ | \\ R^3 \ \ \ =O \end{array} \qquad (III)$$

wherein the carbon atom attached to the oxygen atom is covalently bonded to a moiety which includes said moiety (I) and/or said moiety (II).

In said moiety of formula III, $R^1$, $R^2$ and $R^3$ suitably independently represent a hydrogen atom or an optionally-substituted, preferably unsubstituted, alkyl group. When any of $R^1$, $R^2$ or $R^3$ represent an alkyl group, said alkyl group may be a $C_1$-$C_4$, preferably a $C_{1-2}$, especially a methyl group. Thus, preferably $R^1$, $R^2$ and $R^3$ independently represent a hydrogen atom or a methyl group. Preferably, at least two of $R^1$, $R^2$ and $R^3$ represent hydrogen atoms.

Said polymer (PP) may include 2 to 10, preferably 3 to 7, atoms in a linking chain between the carbon atom attached to the oxygen atom in moiety (Ill) and the sulphur atom in moiety (I) and/or (II). A nitrogen atom is suitably included in said linking chain.

In an embodiment (IA), said moiety (I) is preferably part of a moiety $$XO\!\!-\!\!S\!\!=\!\!O \qquad (IV)$$

wherein X is a hydrogen atom, an alkali metal or $NH_4$. X is preferably an alkali metal, especially sodium.

In embodiment (IA), said moiety (II) is preferably part of a moiety $$\begin{array}{c} O=S=O \\ | \\ OX \end{array} \qquad (V)$$

wherein X is a hydrogen atom, $NH_4$ or an alkali metal. X is preferably an alkali metal, especially sodium.

In said embodiment (IA), said polymer (PP) may include a repeat unit which includes a moiety $$\begin{array}{c} R^1 \ \ R^2 \\ | \ \ | \\ -\!\!\!\!-(C-C)\!\!\!\!- \\ | \\ R^3 \end{array} \qquad (VI)$$

wherein the carbon atom bonded to $R^2$ is bonded to a pendent group which includes said moiety (I) and/or said moiety (II).

Repeat unit (VI) may be of the formula:

$$\begin{array}{c} H_2 \ \ H \\ -\!\!\!\!-(C-C)\!\!\!\!- \\ | \\ SO_3Na \end{array}$$

Said repeat unit of formula (VI) may be part of a moiety of formula $$\begin{array}{c} R^1 \ \ R^2 \\ | \ \ | \\ -\!\!\!\!-(C-C)\!\!\!\!- \\ | \ \ | \\ R^3 \ \ L^1 \\ \phantom{R^3 \ \ }\backslash \\ \phantom{R^3 \ \ \ }S=O \\ \phantom{R^3 \ }/ \\ \phantom{R^3}XO \end{array} \qquad (VII)$$

wherein $L^1$ is a linking atom or group and $R^1$, $R^2$, $R^3$ and X are as described.

$L^1$ may include 3 to 6, preferably 4 to 5, atoms in a chain between the carbon atom bonded to group $R^2$ and the sulphur atom, for example in moiety —S(=O)OX.

In one embodiment, $L^1$ may be —$CH_2$—, suitably deriving from allyl sulfonate monomer. In a third embodiment, $L^1$ may be derived from styrene sulfonate monomer $L^1S(O)OX$ may comprise:

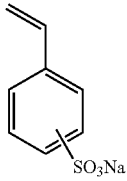

$L^1$ preferably includes an amide group, where suitably both the carbon and nitrogen atoms in said amide group are in said chain. $L^1$ may include a saturated hydrocarbon chain which may be straight or branched. For example, $L^1$ may include a chain which includes a moiety of formula

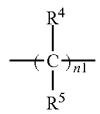

(VIII)

wherein each $R^4$ independently represents a hydrogen atom or an alkyl group, each $R^5$ independently represents a hydrogen atom or an alkyl group and n1 represents an integer, preferably 1 to 4, more preferably 1 to 2. In one embodiment, in moiety (VIII) represents

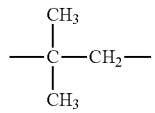

(IX)

In a preferred example of embodiment (IA), said polymer (PP) includes a repeat unit of formula (VII) wherein $L^1$ represents

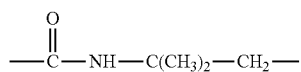

(X)

In an especially preferred example of embodiment (IA), polymer (PP) includes a repeat unit of formula

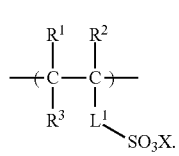

(XI)

In a preferred embodiment the moiety derives from a monomer of the formula

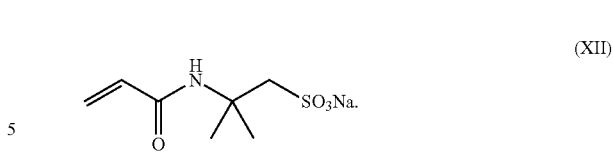

(XII)

In an embodiment (IB), said moiety (I) may be part of a moiety —$SO_3^-$ and is preferably part of a zwitterion.

In said embodiment (IB), said polymer (PP) may include a repeat unit which includes a moiety

(XIII)

wherein the carbon atom bonded to $R^7$ is bonded to a pendent group which includes said $SO_3^-$ moiety.

In said moiety of formula XIII, Re, $R^7$ and $R^8$ suitably independently represent a hydrogen atom or an optionally-substituted, preferably unsubstituted, alkyl group. When any of $R^6$, $R^7$ and $R^8$ represent an alkyl group, said alkyl group may be a $C_1$-$C_4$, preferably a $C_1$-$C_2$, especially a methyl group. Thus, preferably $R^8$, $R^7$ and $R^8$ independently represent a hydrogen atom or a methyl group. Preferably, at least two of $R^6$, $R^7$ and $R^8$ represent hydrogen atoms.

Said repeat unit of formula (XIII) may be part of a moiety of formula

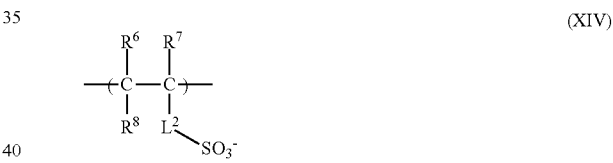

(XIV)

wherein $L^2$ is a linking group and Re, $R^7$ and $R^8$ are as described.

$L^2$ may include 5 to 10, preferably 7 to 9, atoms in a chain between the carbon atom bonded to group $R^7$ and the sulphur atom in moiety $SO_3^-$. $L^2$ preferably includes a group —$C(=O)O$—. $L^2$ preferably includes an N+ moiety, being part of a zwitterion. $L^2$ preferably includes a moiety —$(CH^2)_{n2}$— between said group —$C(=O)O$— and said N+ moiety wherein n2 is an integer, suitably in the range 1 to 5, preferably 1 to 2. $L^2$ preferably includes a moiety —$(CH_2)_{n3}$— between said N+ moiety and said $SO_3$ moiety, wherein n3 is in the range 1 to 6, for example 2 to 4.

In a preferred example of embodiment (IB), polymer (PP) includes a repeat unit of formula (XIV) wherein $L^2$ represents

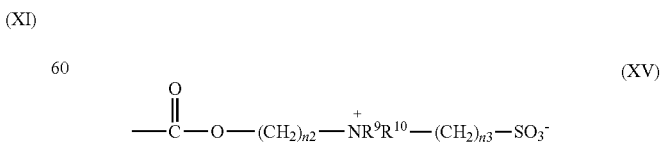

(XV)

wherein n2 and n3 are as described and $R^9$ and $R^{10}$ independently represent $C_{1-4}$ alkyl, preferably methyl, groups.

In a preferred embodiment, n2 represents 2, n3 represents 3, and $R^9$ and $R^{10}$ represent methyl groups.

Although polymer (PP) may be a homopolymer (eg an acrylamido-methyl-propane sulfonate homopolymer such as 2-acrylamido-2-methylpropane sulfonic acid homopolymer), polymer (PP) is preferably a copolymer. Preferably, in both embodiments (IA) and (IB) the repeat units described are part of a copolymer (which term is intended to cover polymers with two or more different repeat units).

Polymer (PP) preferably includes an acrylamide repeat unit, for example of formula (XVI) and/or a repeat unit comprising a vinylpyrrolidone moiety. Polymer (PP) preferably includes an acrylamide repeat unit.

The acrylamide repeat unit may be optionally-substituted. For example, said acrylamide may be an alkylacrylamide (e.g. methacrylamide) or N,N-dialkylacrylamide (e.g. N,N-dimethylacrylamide). Said polymer (PP) preferably includes a repeat unit of formula

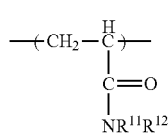

(XVI)

wherein $R^{11}$ and $R^{12}$ are independently selected from a hydrogen atom and an optionally-substituted alkyl group. Said alkyl group is preferably unsubstituted. Said alkyl group may include 1 to 10, preferably 1 to 5, especially 1 to 3 carbon atoms. Preferably, $R^{11}$ and $R^{12}$ independently represent a hydrogen atom, a methyl or an ethyl group. $R^{11}$ and $R^{12}$ preferably represent hydrogen atoms.

Said polymer (PP) may include 5 to 100 mol % (for example 10 to 50 mol %, 10 to 40 mol % or 12 to 45 mol %) of first repeat units of formula (III). It may include 5 to 100 mol % (for example 10 to 50 mol %, 10 to 40 mol % or 12 to 45 mol %) of first repeat units which include a moiety of formula (VI) or of formula (XIII). Said polymer may include 5 to 100 mol % (for example 10 to 50 mol %, 10 to 40 mol % or 12 to 45 mol %) of a single type of first repeat unit which may be of formula (III), formula (VI) or formula (XIII).

Said polymer may include at least some acrylamide repeat units (herein "second repeat unit(s)") which are different to the first repeat units described. The second repeat unit may include carbon, hydrogen, nitrogen and oxygen atoms only. Said second repeat unit may be of formula (XVI). Said polymer (PP) may include a single type of said second repeat unit which may be of formula (XVI).

Said polymer (PP) may include 0 to 99 mol % (for example 50-98 mol %, or 70-95 mol %) of said second repeat units. In this case, said polymer (PP) may include 1 to 100 mol % (for example 2-50 mol %, or 5-30 mol %) of said first repeat units.

The ratio defined as the mol % of said second repeat units (e.g. a single type of second repeat unit) divided by the mol % of said first repeat units (e.g. a single type of first repeat unit) may be at least 1, preferably at least 2. The ratio may be in the range 1 to 50, preferably in the range 1 to 30, more preferably in the range 1 to 20 or 1 to 10.

In said polymer (PP), the sum of the mol % of said first repeat units (preferably a single type of first repeat unit) and said second repeat units (preferably a single type of said second repeat unit) is at least 70 mol %, suitably at least 85 mol %, more preferably at least 95 mol % and, especially, is at least 99 mol %.

In one embodiment, said polymer may include three repeat units—said first and second repeat units (especially said first repeat unit in combination with a second repeat unit which is an acrylamide) and a third repeat unit which is an N-vinylpyrrolidone.

Said polymer (PP) is preferably a copolymer of acrylamido-methyl-propane sulfonate (e.g. 2-acrylamido-2-methylpropane sulfonic acid) and acrylamide. It preferably includes 5 to 40 mol % of acrylamido-methyl-propane sulfonate repeat units and 60 to 90 mol % of acrylamide repeat units.

Said polymer (AA) preferably does not include any phosphonate moiety. It preferably does not include any phosphorus-containing moiety.

Said polymer (AA) preferably does not include any cationic moiety except optionally as part of a zwitterion. Said polymer (AA) preferably does not include any free quaternary ammonium groups.

Said polymer (PP) may have a molecular weight of at least 1,000,000 Daltons, preferably at least 2,000,000 Daltons, more preferably at least 3,000,000 Daltons. The molecular weight may be in the range 1,000,000 to 50,000,000 Daltons, preferably in the range 2,000,000 to 10,000,000 Daltons, more preferably in the range 3,000,000 to 8,000,000 Daltons and especially in the range of 4,000,000 to 7,000,000. Molecular weight, described herein, may be measured by Measurement of Intrinsic Viscosity (see ISO 1628/1-1984-11-01); and using Intrinsic Viscosity/Molecular Weight Correlation via the Mark-Houwink Equation.

Said polymer (PP) may have a polydispersity in the range 1-7, preferably between 2 to 5

Said polymer (PP) may be provided in any suitable state for introduction into an aqueous fluid. For example the polymer may be granular, as a powder, a dispersion, an inverse emulsion or a dispersion of polymer powder within the oil phase of an inverse emulsion as taught in WO2017187150.

Said polymer (PP) may be prepared by techniques known to skilled persons, such as: free radical techniques for example gel polymerisation, solution polymerisation, inverse emulsion polymerisation, dispersion polymerisation, precipitation polymerisation, frontal polymerisation or bulk polymerisation; anionic polymerisation or hydrogen transfer polymerisation; and controlled radical techniques, for example reversible addition-fragmentation chain-transfer (RAFT), atom transfer radical polymerisation (ARTP) or single electron transfer living radical polymerisation (SET-LRP).

Said fluid (A) may include at least 100 ppm of polymer (PP). It may include less than 0000 ppm of polymer (PP). Preferably, fluid (A) includes 100-10,000 ppm, more preferably 150-1,100 ppm of polymer (PP).

Said fluid (A) preferably includes water, for example up to 99.9% water, but preferably is includes up to 95 wt % water. Water which suitably forms the major part of fluid (A) described herein may be derived from any convenient source. It may be potable water, surface water, sea water, brine, flow-back water, aquifer water or produced water. References herein to amounts of water, particularly in the context of water which forms a major part of a fracturing fluid described, suitably refer to water inclusive of components present in the source of water, such as dissolved salts found in sea water.

Other additives in fluid (A) may be selected from corrosion inhibitors, proppant particulates, acids, fluid loss control additives, biocides, surfactants and scale inhibitors, clay control additives, foamers, paraffin inhibitors, gelling agents, pH adjustment additives, buffers, cross-linkers, oxidizing agents, enzymes and gel degrading agents.

Preferably, at some stage in the method, one or a plurality of proppants is incorporated into fluid (A). The proppant may have a size of at least 140 US Mesh; it may have a size of less than 5 US Mesh. The proppant may be selected from sand, bauxite and man-made intermediate or high strength materials. The proppant is arranged to restrict close down of a fracture on removal of hydraulic pressure which caused the fracture.

Preferably, at some stage in the method, said fracturing fluid includes 2.9 to 54 wt %, for example 5 to 40 wt %, of proppants.

Preferably, the only polymer for friction reduction in said fluid (A) is said polymer (PP). Said fluid (A) preferably does not include any cationic polymer containing a hydrolysable group within a group pendent from the polymer backbone. For example, said fluid (A) preferably does not include copolymers comprising [2-(Acryloyloxy)ethyl]trimethylammonium chloride, ADAMe® provided by Arkema, and the like. Said fluid (A) preferably does not include an anionic polymer comprising a pendent group that will strongly bind with iron, for example a P-containing functional group such as a phosphonic acid-based group.

Said fluid (A) preferably does not include a ferric ion reducing agent, for example as described in U.S. Pat. No. 5,674,817.

Said subterranean formation treated in the method is suitably a formation which is susceptible to formation of the undesirable gel-like goo described in the introduction of the present specification or a formation in which said undesirable gel-like goo has been observed and/or has formed. Thus, the method preferably comprises contacting such a formation, especially a formation identified as susceptible to formation of said undesirable gel-like goo (or in which said undesirable gel-like goo has been identified), with said fluid (A).

It has been found that formations in certain geographical locations are susceptible to formation of said undesirable gel-like goo. In one such example, said formation may be within the state of Oklahoma. For example it may be in the Woodford play, Oklahoma (sometimes referred to as Woodford Shale, the Cana-Woodford play or Cana-Woodford Shale).

It has been found that formations having certain rock types or rock constituents are susceptible to formation of said undesirable gel-like goo. Said formation may comprise a shale. A pulverized core sample of the formation may have one or more of the following characteristics:

Total acid solubility of 15-60 wt %, preferably 18-57 wt %, more preferably 34-57 wt %.
HCl solubility of 2-25 wt %, preferably 2.50-20.0 wt %; more preferably 4.20-19.8 wt %.
HF solubility of 12-50% wt %, preferably 15-41 wt %, more preferably 26-41 wt %.

The % of solids dissolvable by acid was determined by treating a pulverized core sample sequentially with 15% HCl then a solution of 6% HCl and 1.5% HF at 180° F. for 1 hour as taught in SPE143960.

The mineral content within formation rock may be assessed by XRD analysis. The formation rock may include rock having an $Fe(II)S_2$-containing mineral at a level of greater than 0 wt % preferably more than 0.1 wt %, or at least 1 wt %. The $Fe(II)S_2$-containing mineral may be present at a level of less than 25 wt % and may be present at a level in the range of 1-10 wt % or 3-8 wt %.

The $Fe(II)S_2$-containing mineral in said formation rock may be pyrite or marcasite or a mixture of pyrite and marcasite. The formation rock may have a marcasite content in the range 0-11 wt %, preferably 1-3 wt %.

The formation rock may have a pyrite content of at least 0.1 wt %, preferably between 1-12 wt % or 1.9-4.1 wt %.

The average of $Fe(II)S_2$-containing mineral in the formation may be at least 0.11 wt % and is preferably in the range 1-8 wt %, more preferably 3.5-8.0 wt %. The average content of pyrite may be between 1-6 wt %, preferably 2-5 wt %. The average content of Marcasite may be between 1-4 wt %, preferably 1.5-3 wt %.

The formation rock may include feldspar for example at a level in the range 1-15.8 wt %, preferably 2-14 wt %, most commonly 3-10 wt %.

The Total Organic Content in the formation rock may be between, 0.1 and 10 wt %, for example between 0.5 and 9 wt %.

The formation rock may include other minerals at the following levels:
Dolomite 2-12 wt %, preferably 4-10 wt %
Quartz: 25-86 wt %, preferably between 45-78 wt %
Carbonates 0-5 wt %
Magnesite 0-18%, preferably between 0-2 wt %
Chlorite 0-1 wt %
Calcite 0-10 wt %
Barite 0-2 wt %

It has been found that formations having produced/formation water having certain levels of constituents are susceptible to formation of said undesirable gel-like goo. Said formation may include Total Dissolved Solids (TDS) of at least 5,000 ppm, for example at least 10,000 ppm, at least 15,000 ppm or at least 20,000 ppm. TDS may be analysed by ICP Ion breakdown and reported in mg/L. The formation water may include one or more (especially each) of the following levels of the specified dissolved solids:
Ca: 60-65 mg/L, preferably 62-63 mg/L;
Mg: 25-30 mg/L, preferably 27-28 mg/L;
Ba: 8-11 mg/L; preferably 9-10 mg/L;
Sr: 47-52 mg/L, preferably 49-50 mg/L;
$CO_3^{-2}$: 0 mg/L;
$HCO_3^-$: 700-1000 mg/L, preferably 800-950 mg/L;
Na: 6500-8500 mg/L; preferably 7000-7500 mg/L;
B: 80-90 mg/L; preferably 86-88 mg/L;
Fe(II): 5-15 mg/L, preferably 6-11 mg/L;
Al: 0-0.1 mg/L, preferably 0.01-0.02 mg/L;
K: 125-175 mg/L, preferably 150-160 mg/L;
Li: 3-4 mg/L, preferably 3.5-3.6 mg/L;
Mn 0.1-0.2 mg/L, preferably 0.11-0.14 mg/L
Si: 35-50 mg/L, preferably 40-45 mg/L;
Zn 0-0.1 mg/L, preferably 0.01-0.07 mg/L.

It has been found that formations having ICP Flowback water analysis as described in the SPE paper cited above are susceptible to formation of said undesirable gel-like goo. Said formation may yield a fluid comprising one or more (especially each) of the following after fracturing:
Al: at least 5 ppm, suitably at least 10 ppm; and less than 250 ppm, preferably less than 200 ppm;
B: between 0 and 150 ppm, preferably 10-100 ppm, more preferably 20-90 ppm;
Ba: between 0-50 ppm;
Ca: at least 50 ppm, preferably at least 100 ppm; and less than 750 ppm, preferably less than 650 ppm; and preferably in the range 200-450 ppm;

Fe at least 100 ppm, at least 250 ppm, or at least 500 ppm; and less than 1500 ppm, less than 1250 ppm; and preferably in the range 600-1100 ppm, preferably 725-1025 ppm;

K: at least 100 ppm, at least 200 ppm or at least 300 ppm;

Sr: 0-100 ppm.

In a preferred embodiment, formations treated in the method (and which may otherwise be susceptible to formation of said undesirable gel-like goo) may include one or more (preferably each) of the following characteristics:

Total acid solubility of a pulverized core sample 18-57 wt %; $Fe(II)S_2$ mineral content 1-10 wt %; and, optionally, dolomite 2-12 wt %;

Quartz 25-86 wt %, Feldspar 1-15 wt %; dolomite 2-12 wt %; pyrite 1-12 wt %; marcasite 0-11 wt %; illite at least 2.5 wt %; and, optionally, Mica from 0-40 wt %;

Produced water containing: Ca 60-65 mg/L, Mg 25-30 mg/L, Fe 5-15 mg/L and, optionally, Na 6500-8500 mg/L; and/or Flowback water containing: Al at least 5 ppm, Fe at least 100 ppm, B 0-150 ppm, Ca at least 50 ppm and K at least 100 ppm.

The formation is suitably one which is susceptible to formation of an "unusual semi-solid" and/or "rubbery material" referred to in SPE-173594-MS.

The method of the first aspect preferably comprises fracturing a subterranean formation in a method comprising contacting the formation with a fluid (A) (which is suitably a fracturing fluid). Said method preferably comprises fracturing a subterranean formation penetrated by a wellbore by pumping the fluid (A) into the wellbore at a pressure sufficient to create a fracture network. Said polymer (AA) is preferably for specifically adapted for use in a slick water fracturing treatment.

According to a second aspect of the invention, there is provided the use of a polymer (PP) and/or a fluid (A) as described in the first aspect for treating a subterranean formation for example one which may be susceptible to formation of a undesirable gel-like goo as referred to herein and in SPE-173594-MS.

A subterranean formation susceptible to formation of undesirable gel-like goo may be a formation which is: (i) one that is previously known to form a undesirable gel-like goo, (ii) one that is similar in mineralogy to a formation known to form a undesirable gel-like goo. The formation may be one that is located close to (eg within 10 km, for example within 5 km, 2 km, 1 km or 500 m of) a well that is known to form an undesirable gel-like goo.

According to a third aspect of the invention, there is provided a method of preparing a fluid (A) for fracturing a subterranean formation for example one which may be susceptible to formation of a undesirable gel-like goo for example as referred to herein and in SPE-173594-MS, the method comprising contacting a polymer (PP) as described in the first aspect with water with mixing.

A subterranean formation susceptible to formation of undesirable gel-like goo may be as described in the first and/or second aspects.

According to a fourth aspect of the invention, there is provided a fluid (A) comprising a polymer (PP) as described in the first aspect.

According to a fifth aspect of the invention, there is provided an assembly positioned adjacent a subterranean formation, for example one which may be susceptible to formation of a undesirable gel-like goo as referred to herein and in for example SPE-173594-MS, said assembly being arranged to deliver a fluid (A) into the formation, said assembly comprising:

(I) a receptacle containing a fluid (A) comprising a polymer (PP) as described in the first aspect;

(II) a water supply;

(III) a pump (PI) for dosing fluid (A) from said receptacle into said water supply, suitably to define at least part of a fracturing fluid;

(IV) a conduit for delivering fracturing fluid into the formation; and (V) a pump (P2) for injecting the fracturing fluid via said conduit into the formation.

Any aspect of any invention described herein may be combined with any feature described in any other aspect of any invention or embodiment described herein mutatis mutandis.

Specific embodiments of the invention will now be described, by way of example.

In the following examples, an iron stock solution was prepared and this was used to test friction reducers to assess the extent to which the friction reducers may disadvantageously interact with the iron to produce an undesirable gel-like goo comprising iron as described herein.

Example 1—Analysis Of Water Used In Experiments

Water chemistry was determined via Inductively Coupled Plasma—Optical Emission Spectroscopy (ICP-OES). Water samples were digested using concentrated nitric acid and then analyzed by a Spectro Arcos ICP-OES. Each water sample was run in triplicate using three different dilutions in order to ensure accuracy.

Deionized water was assessed to determine ion content, since such water was used to prepare ferric ion solution used in subsequent procedures. In addition, local "Woodlands tap water" was assessed.

Results are provided in the table below.

| Sample Name | Deionized Water | The Woodlands Tap Water |
|---|---|---|
| Sample Date | January 2019 | |
| Notes | Used to prepare 10,000 ppm ferric iron solution | Used to prepare various FR solutions |
| Properties (72° F.) | | |
| pH | — | 7.98 |
| Specific Gravity | 1.00 | 1.00 |
| Density ($lb_m$/gal) | 8.33 | 8.33 |
| Total Dissolved Solids (ppm) | 0.17 | 368 |
| Hardness Cations (mg/L) | | |
| Calcium ($Ca^{+2}$) | 0.00 | 12.42 |
| Magnesium ($Mg^{+2}$) | 0.00 | 1.14 |
| Barium ($Ba^{+2}$) | 0.00 | 0.06 |
| Strontium ($Sr^{+2}$) | 0.00 | 0.10 |
| Anions (mg/L) | | |
| Chlorides ($Cl^-$) | 0.00 | 41.66 |
| Sulfates ($SO_4^{-2}$) | 0.12 | 11.90 |
| Phosphate ($PO_4^{-3}$) | 0.00 | 0.06 |
| Alkalinity (mg/L) | | |
| Bicarbonates ($HCO_3^-$) | — | 201 |
| Carbonates ($CO_3^{-2}$) | — | 0 |
| Hydroxide ($OH^-$) | — | 0 |

| Sample Name | Deionized Water | The Woodlands Tap Water |
|---|---|---|
| Select Ions (mg/L) | | |
| Sodium (Na$^+$) | 0.00 | 87.53 |
| Boron (B$^{+3}$) | 0.04 | 0.11 |
| Iron (Fe$^{+2}$, Fe$^{+3}$) | 0.00 | 0.02 |
| Other Cations | | |
| Aluminum (Al$^+$) | 0.00 | 0.01 |
| Potassium (K$^+$) | 0.00 | 2.65 |
| Lithium (Li$^+$) | 0.00 | 0.01 |
| Manganese (Mn$^+$) | 0.00 | 0.00 |
| Silicon (Si$^{+4}$) | 0.00 | 7.85 |
| Zinc (Zn$^{+2}$) | 0.00 | 0.02 |

"—" = Not Reported

Example 2—General Procedure For Preparation of Friction Reducer Solutions 2,000 mL master batches of selected friction reducers in The Woodlands tap water were prepared using an overhead stirrer equipped with a cross impeller. The tap water was added to a 2 L plastic beaker using a 2 L volumetric flask. A vortex was created which was about 75% below the surface while stirring, while avoiding the entrainment of air. To the side wall of the vortex, the desired amount of friction reducer (1000 ppm) was added and allowed to mix until the vortex began to close (about 1.5 minutes). The mixer speed was adjusted to half and gentle agitation was continued for another 1.5 minutes.

Example 3—General Procedure For Preparing Ferric Iron Stock Solution

A 250 mL stock solution of a 10,000 ppm ferric iron solution in deionized water was prepared using a 250 mL volumetric flask. To this end, the flask was filled with water to the measurement line at 21.1° C. 12.1029 g of FeCl$_3$.6H$_2$O was added in a fume hood. The flask was capped and gently inverted and swirled under the fume hood, taking care to vent the solution. The pH and density of the stock solution were measured and recorded.

Example 4—Iron Interaction Test—General Procedure

A 50 ml solution was made up to contain 50 ppm of Fe(III) and 950 ppm of a selected reducer. The solution was then aged at 70° C. for a 48 hour period. After 48 hours the solution was then swirled and left standing for 15 minutes before the degree of solid formation was recorded.

Examples 5 To 7—Testing Of Friction Reducers

Following the general procedure described in Example 4, three friction reducers were assessed as follows

| Example No. | Description |
|---|---|
| 5 | A copolymer of acrylamide and ATBS - CAS no 38193-60-1, sold as having a 30% ATBS content with a MW of 4.5-7 × 10$^6$ Da |
| 6 (Comparative) | An anionic friction reducer which was a co-polymer of acrylamide and acrylic acid, having 30 mol % of acrylic acid with a MW of 15-20 × 10$^6$ Da (CAS no 25987-30-8) |
| 7 (Comparative) | A cationic friction reducer which was a co-polymer of acrylamide and dimethylaminoethyl acrylate (ADAM), having 30 mol % of ADAM and a MW of 10-15 × 10$^6$ Da (CAS no. 69418-26-4) |

Post heating (80° C.) overnight (8-10 hours) all polymer solutions contained an orange residue on bottom of the test bottles that dissipated upon shaking for Example 5 only. In contrast, for Example 6 and 7 fluids tested contained flocculated, gel-like species dispersed throughout.

From the above results, the lack of flocculated gel-like species for Example 5 indicates a resistance to coagulation/flocculation with the iron species present. It is therefore believed the copolymer of Example 5 will act to alleviate the formation of the undesirable gel-like goo comprising iron as described herein.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of fracturing a subterranean formation susceptible to formation of a undesirable gel-like goo, the method comprising:

contacting the formation with a fluid (A) comprising a friction reducer polymer (PP) which includes a pendent group which includes a moiety

(I), and reducing and/or minimizing undersirable gel-like goo within the subterranean formation, wherein the sulphur atom of the moiety is covalently bonded, optionally via a linking atom or group, to the backbone of the polymer, and wherein formation water includes Total Dissolved Solids (TDS) of at least 5000 ppm; and formation rock within the subterranean formation includes rock having an Fe(II)S$_2$-containing mineral at a level of greater than 0.1 wt %.

2. The method according to claim 1, wherein said subterranean formation is: (i) one that is previously known to form said undesirable gel-like goo; or (ii) one that is similar in mineralogy to a formation known to form said undesirable gel-like goo.

3. The method according to claim 1, wherein moiety (I) is part of a moiety of formula

(II)

4. The method according to claim 3, wherein moiety (I) and/or moiety (II) is pendent from a repeat unit of formula

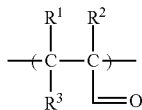 (III)

wherein the carbon atom attached to the oxygen atom is covalently bonded to a moiety which includes said moiety (I) and/or said moiety (II), wherein $R^1$, $R^2$ and $R^3$ independently represent a hydrogen atom or an optionally-substituted alkyl group.

5. The method according to claim 4, wherein said polymer (PP) includes 2 to 10 atoms in a linking chain between the carbon atom attached to the oxygen atom in moiety (III) and the sulphur atom in moiety (I) and/or (II), wherein a nitrogen atom is included in said linking chain.

6. The method according to claim 3, wherein said moiety (I) is part of a moiety

 (IV)

and said moiety (II) is part of a moiety

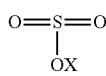 (V)

wherein X is a hydrogen atom, an alkali metal or $NH_4$;
wherein said polymer (PP) includes a repeat unit which includes a moiety

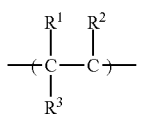 (VI)

wherein the carbon atom bonded to $R^2$ is bonded to a pendent group which includes said moiety (I) and/or said moiety (II) and $R^1$, $R^2$ and $R^3$ independently represent a hydrogen atom or an optionally-substituted alkyl group.

7. The method according to claim 6, wherein said repeat unit of formula (VI) is part of a moiety of formula

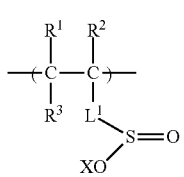 (VII)

wherein $L^1$ is a linking atom or group and wherein, optionally, $L^1$ includes 3 to 6 atoms in a chain between the carbon atom bonded to group $R^2$ and the sulphur atom.

8. The method according to claim 7, wherein said polymer (PP) includes a repeat unit of formula (VII) wherein $L^1$ represents

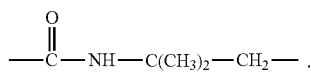 (X)

9. The method according to claim 1, wherein polymer (PP) includes a repeat unit derived or derivable from a monomer of the formula

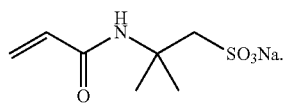 (XII)

10. The method according to claim 1, wherein said moiety (I) is part of a moiety $—SO_{3-}$ and is part of a zwitterion and said polymer (PP) includes a repeat unit which includes a moiety

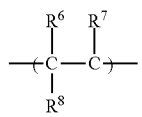 (XIII)

wherein the carbon atom bonded to $R^7$ is bonded to a pendent group which includes said $SO_{3-}$ moiety and $R^6$, $R^7$ and $R^8$ independently represent a hydrogen atom or an optionally-substituted alkyl group; and, optionally,
said repeat unit of formula (XIII) is part of a moiety of formula

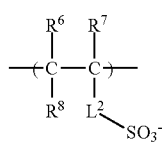 (XIV)

wherein $L^2$ is a linking group, wherein $L^2$ represents

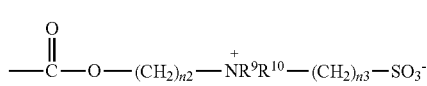 (XV)

wherein n2 is an integer in the range 1 to 5, n3 is an integer in the range 1 to 6 and $R^9$ and $R^{10}$ independently represent $C_{1-4}$ alkyl groups.

11. The method according to claim 1, wherein polymer (PP) is a copolymer which includes an acrylamide repeat unit and/or a repeat unit comprising a vinylpyrrolidone moiety.

12. The method according to claim 1, wherein polymer (PP) includes a repeat unit of formula

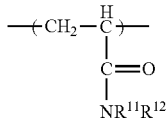 (XVI)

wherein $R^{11}$ and $R^{12}$ are independently selected from a hydrogen atom and an optionally-substituted, alkyl group.

13. The method according to claim 4, wherein said polymer (PP) includes 5 to 100 mol % of first repeat units of formula (III).

14. The method according to claim 4, wherein said polymer (PP) includes at least some acrylamide repeat units (herein "second repeat unit(s)") which are different to first repeat units III, wherein said polymer (PP) includes 0 to 99 mol % of said second repeat units; and the ratio defined as the mol % of said second repeat units divided by the mol % of said first repeat units is in the range 1 to 50.

15. The method according to claim 14, wherein in said polymer (PP), the sum of the mol % of said first repeat units and said second repeat units is at least 70 mol %.

16. The method according to claim 1, wherein said polymer (PP) is a copolymer of acrylamido-methyl-propane sulfonate and acrylamide which includes 5 to 40 mol % of acrylamido-methyl-propane sulfonate repeat units and 60 to 90 mol % of acrylamide repeat units.

17. The method according to claim 16, wherein said polymer (PP) does not include any phosphonate moiety; and/or does not include any cationic moiety except as part of a zwitterion; and/or does not include any free quaternary ammonium groups.

18. The method according to claim 16, wherein said polymer (PP) has a molecular weight in the range 1,000,000 to 50,000,000 Daltons; and/or a polydispersity in the range 1-7.

19. The method according to claim 18, wherein said fluid (A) includes 100-10,000 ppm of polymer (PP); and includes up to 95 wt % water.

20. The method according to claim 1, wherein, at some stage in the method, one or a plurality of proppants is incorporated into fluid (A), wherein the proppant has a size of at least 140 US Mesh and/or said fracturing fluid includes 2.9 to 54 wt % of proppants.

21. The method according to claim 1, wherein the only polymer for friction reduction in said fluid (A) is said friction reducer polymer (PP) and/or said fluid (A) does not include:
   any cationic polymer containing a hydrolysable group within a group pendent from the polymer backbone; and/or
   any anionic polymer comprising a pendent group that will complex with iron; and/or
   any polymer which includes a P-containing functional group such as a phosphonic acid-based group.

22. The method according to claim 1, wherein the method comprises fracturing a subterranean formation in a method comprising contacting the subterranean formation with a fluid (A) and fracturing the subterranean formation by pumping the fluid (A) into a wellbore at a pressure sufficient to create a fracture network.

23. The method according to claim 1, wherein said method is a method of slick water fracturing of said subterranean formation.

24. The method according to claim 1, wherein formation water includes Total Dissolved Solids (TDS) of at least 5000 ppm; and
   the formation rock includes rock having an Fe(II)S$_2$-containing mineral at a level of at least 1 wt %.

25. The method according to claim 1, wherein formation water includes Total Dissolved Solids (TDS) of at least 5000 ppm; and
   ICP Flowback water analysis yields a fluid comprising at least 100 ppm Fe.

* * * * *